United States Patent
Hanes

(10) Patent No.: US 9,679,137 B2
(45) Date of Patent: Jun. 13, 2017

(54) ANTI-VIRAL SCANNING IN NETWORK ATTACHED STORAGE

(75) Inventor: David H. Hanes, Ft. Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3486 days.

(21) Appl. No.: 11/528,127

(22) Filed: Sep. 27, 2006

(65) Prior Publication Data

US 2008/0077987 A1 Mar. 27, 2008

(51) Int. Cl.
*G06F 21/56* (2013.01)

(52) U.S. Cl.
CPC ................................. *G06F 21/562* (2013.01)

(58) Field of Classification Search
CPC .................................................. G06F 21/562
USPC .......................................................... 726/24
See application file for complete search history.

(56) References Cited

U.S. PATENT DOCUMENTS

| | | | |
|---|---|---|---|
| 6,802,012 B1* | 10/2004 | Smithson et al. ............... | 726/24 |
| 6,971,023 B1* | 11/2005 | Makinson et al. ............. | 713/193 |
| 7,234,032 B2* | 6/2007 | Durham et al. ............... | 711/161 |
| 7,363,657 B2* | 4/2008 | Caccavale ........................ | 726/24 |
| 7,386,546 B1* | 6/2008 | Santry et al. | |
| 7,665,137 B1* | 2/2010 | Barton et al. .................... | 726/24 |
| 7,818,807 B1* | 10/2010 | McCorkendale et al. ...... | 726/24 |
| 7,861,302 B1* | 12/2010 | Raz et al. ........................ | 726/24 |
| 7,971,254 B1* | 6/2011 | Ji et al. ............................ | 726/24 |
| 2002/0046320 A1* | 4/2002 | Shaath ........................... | 711/112 |
| 2002/0129277 A1* | 9/2002 | Caccavale ...................... | 713/201 |
| 2004/0186971 A1* | 9/2004 | Meharchand et al. ........ | 711/163 |
| 2005/0044400 A1* | 2/2005 | Li et al. .......................... | 713/200 |
| 2005/0149749 A1* | 7/2005 | Van Brabant ................. | 713/200 |
| 2006/0156030 A1* | 7/2006 | Saika .............................. | 713/188 |
| 2006/0242686 A1* | 10/2006 | Toda et al. ......................... | 726/3 |
| 2008/0184370 A1* | 7/2008 | Ouchi ............................. | 726/24 |
| 2010/0306849 A1* | 12/2010 | Zheng et al. ................... | 726/24 |
| 2012/0297486 A1* | 11/2012 | Turbin ............................ | 726/24 |

OTHER PUBLICATIONS

Symantec, Feb. 2004, Symantec Enterprise Security, Securing Network-Attached Storage, pp. 1-9.*
Trend Micro, Jul. 2001, Trend Micro White Paper, pp. 1-15.*
McAfee Security, Feb. 2003, VirusScan Enterprise version 7.0, pp. 1-44.*
Cheng et al, Disk Management for A Hard Real-Time System, 1996, IEEE, pp. 255-260.*
Chiueh et al, Stonehenge: A Fault-Tolerant Real-Time Network Attached Storage Device, 2001, IEEE, pp. 57-61.*

* cited by examiner

*Primary Examiner* — Bradley Holder
*Assistant Examiner* — Jenise Jackson
(74) *Attorney, Agent, or Firm* — Trop Pruner & Hu, PC

(57) ABSTRACT

In one embodiment a method comprises initiating, by a network attached storage device, a virus scan process on the network attached storage device, receiving, by the network attached storage device, a first file access request that identifies a file, and interrupting the virus scan process to respond to the first file access request.

19 Claims, 4 Drawing Sheets

ANTI-VIRAL SCANNING IN NETWORK ATTACHED STORAGE

BACKGROUND

The term Network Attached Storage (NAS) refers to a dedicated data storage device(s) connected directly to a computer network to provide centralized data access and storage services to one or more network clients such as, e.g., a personal computer. NAS devices typically comprise one or more storage media such as, e.g., magnetic disk drives, optical drives, magneto-optical drives, tape drives, or the like. The storage media may be configured to implement logical storage objects such as, e.g., RAID (redundant array of inexpensive/independent disks). NAS devices may implement a file sharing operating system such as, e.g., Network File System (NFS) to provide data storage and access management services to network clients.

NAS devices are not commonly targeted by computer viruses and/or Trojan horses. However, NAS devices may store files that are infected with a virus or a Trojan horse. Network clients that access the infected file(s) on the NAS device may then become infected with the virus or Trojan horse.

DETAILED DESCRIPTION

Described herein are exemplary systems and methods for anti-viral scanning in network attached storage. The methods described herein may be embodied as logic instructions stored on a computer-readable medium. When executed on a processor, the logic instructions cause a general processor to be programmed as a special-purpose machine that implements the described methods. The processor, when configured by the logic instructions to execute the methods recited herein, constitutes structure for performing the described methods.

Figure 1:
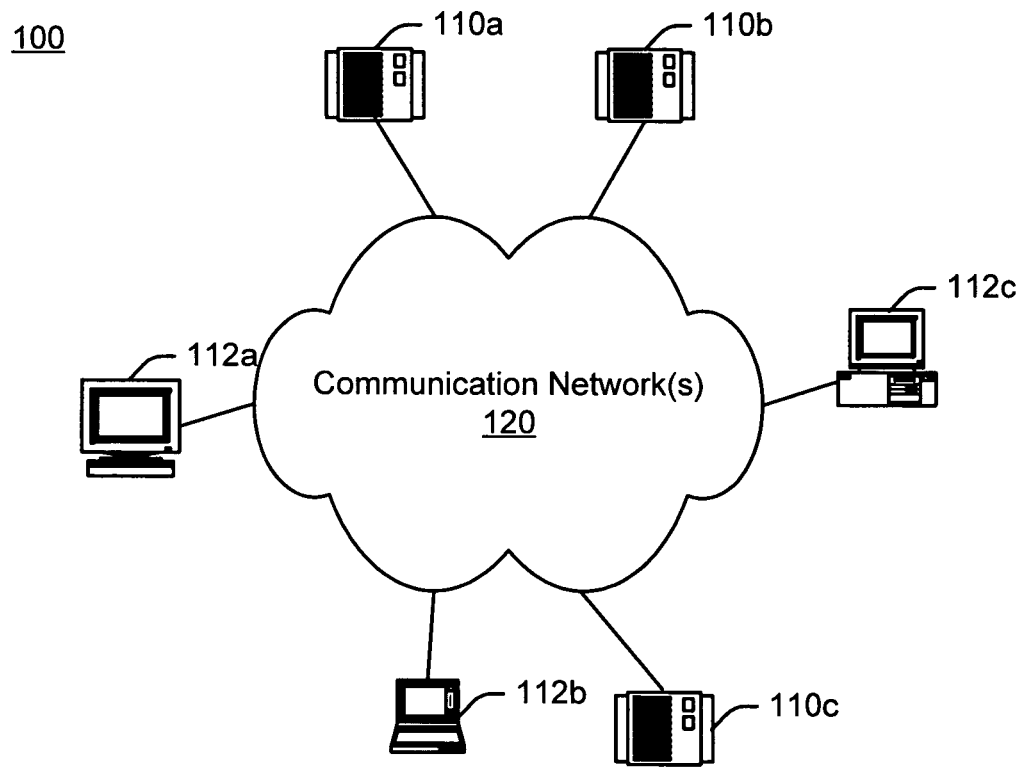
FIG. 1 is a schematic illustration of one embodiment of network attached storage environment.

FIG. 1 is a schematic illustration of one embodiment of network attached storage environment. Environment 100 may comprise a one or more network attached storage devices 110a, 110b, 110c connected to one or more network clients 112a, 112b, 112c by a communication network 120.

Network attached storage devices 110a, 110b, 110c may be implemented as one or more communicatively connected storage devices. Exemplary storage devices may comprise, but are not limited to, the ProLiant™ line of storage devices commercially available form Hewlett-Packard Corporation of Palo Alto, Calif., USA. In some embodiments, at least a portion of communication network 120 may be implemented as a private, dedicated network such as, e.g., a local area network (LAN) or a wide area network (WAN). Alternatively, portions of communication network 120 may be implemented using public communication networks pursuant to a suitable communication protocol such as, e.g., the Internet.

Network clients 112a, 112b, 112c may be implemented as computing devices such as, e.g., a networked computer 112a, a laptop computer 112b, a desktop computer 112c, or the like. Applications running on network clients 112a, 112b, 112c may initiate file access requests to access information stored in network attached storage devices 110a, 110b, 110c. Network attached storage devices 110a, 110b, 110c receive file access requests and, in response, locate and return the requested information to the network client that originated the request.

Figure 2:
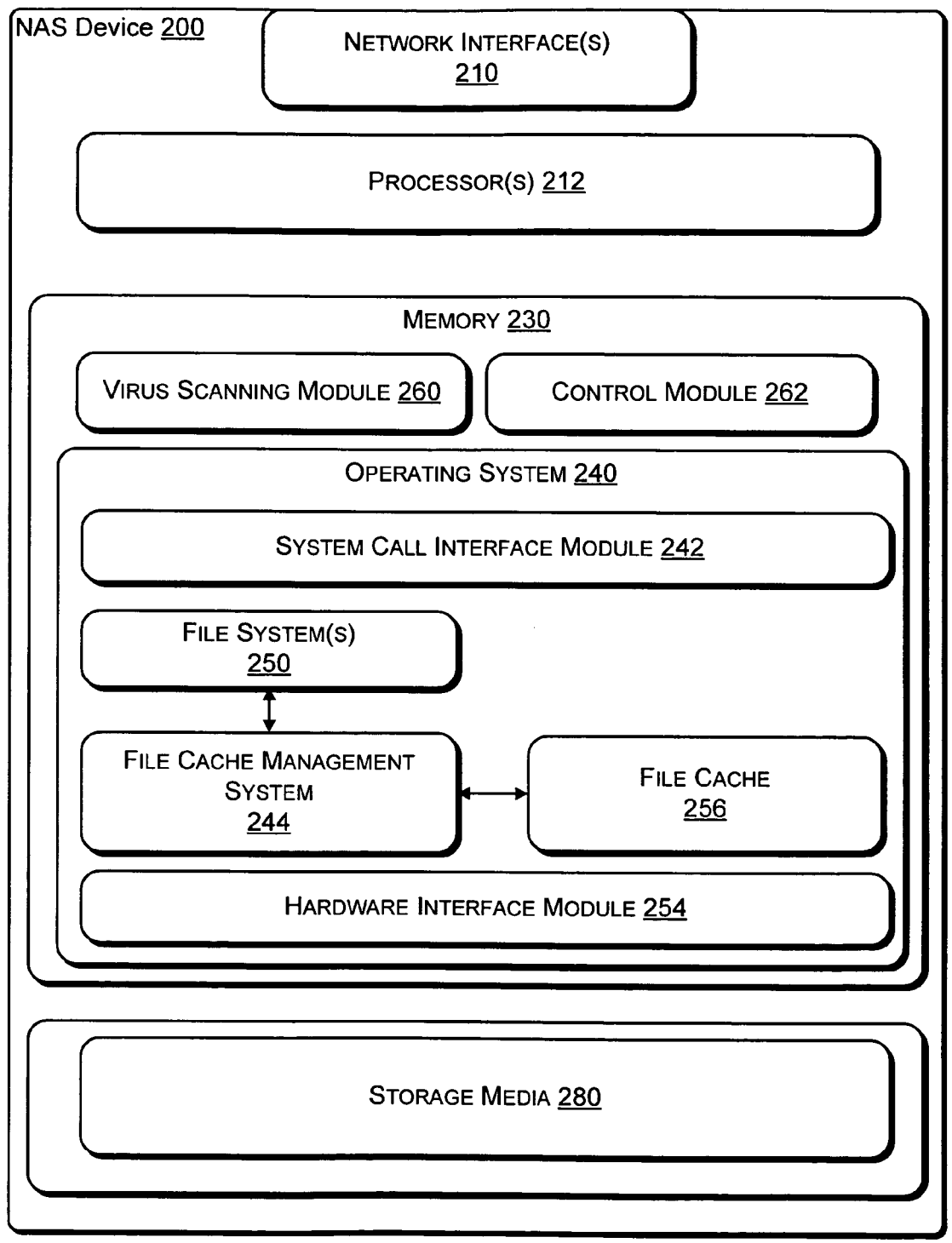
FIG. 2 is a schematic illustration of an exemplary network attached storage device.

FIG. 2 is a schematic illustration of one embodiment of a network attached storage (NAS) device 200, which may be used to implement one or more of network attached storage devices 110a, 110b, 110c depicted in FIG. 1. Referring to FIG. 2, network storage device 200 comprises one or more network interfaces 210 which enables a communication connection with a network such as, e.g., network 120.

Network interface 210 may comprise an input/output (I/O) port to provide a physical connection with a network. For example, network interface 210 may comprise an Ethernet port. Network interface 210 may comprise a network interface card (NIC), also commonly referred to as a network adapter or a network card. The NIC manages I/O operations to enable NAS device 200 to communicate over a network. Alternatively, the operations of the NIC may be implemented on a main circuit board such as, e.g., a motherboard of NAS device 200.

NAS device 200 further comprises at least one processor 212. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

NAS device 200 further comprises system random access memory and/or read-only memory 230. Memory 230 comprises an operating system 240 for managing operations of NAS device 200. In one embodiment, operating system 240 comprises a hardware interface module 254 that provides an interface to system hardware. The particular embodiment of operating system 240 is not critical to the subject matter described herein. Operating system 240 may be embodied as a UNIX operating system or any derivative thereof (e.g., Linux, Solaris, etc.) or as a Windows® brand operating system.

Operating system 240 comprises (or interfaces with) a file system(s) 250 that manages files used in the operation of NAS device 200. For example, file system(s) 250 may implement one or more of a Network File System (NFS) protocol, a Common Internet File System (CIFS) protocol, or the like. In one embodiment operating system 240 may comprise a file cache management system 244 interposed logically between the file system(s) 250 and underlying modules such as, e.g., the hardware interface module 254. File cache management system 244 interfaces with the file system(s) 250 to manage the file cache 256 as a resource that may be shared between users of the computer system, e.g., on a per-workload basis.

Operating system 240 further comprises a system call interface module 242 that provides an interface between the operating system 240 and one or more application modules that execute on NAS device 200.

NAS device 200 further comprises storage media 280. For example, storage media 280 may be embodied as one or more arrays of magnetic disk drives. Alternatively, storage media 280 may comprise optical, magneto-optical, or electro-optical storage media. Storage media 280 may be configured to implement RAID redundancy.

NAS storage device 200 further comprises a virus scanning module 260. In some embodiments, virus scanning module is embodied as a software module that executes on processor(s) 212. In such embodiments, virus scanning module 260 executes as a background process to scan files stored on NAS storage device 200 for viruses, Trojan horses, worms, or the like.

NAS storage device 200 further comprises a control module 262 that controls the operation of virus scanning module 260 in response to file access requests from network clients such as, e.g., network clients 112*a*, 112*b*, 112*c*. Operations implemented by some embodiments of control module 262 are described with reference to FIG. 3 and FIG. 4.

Figure 3:
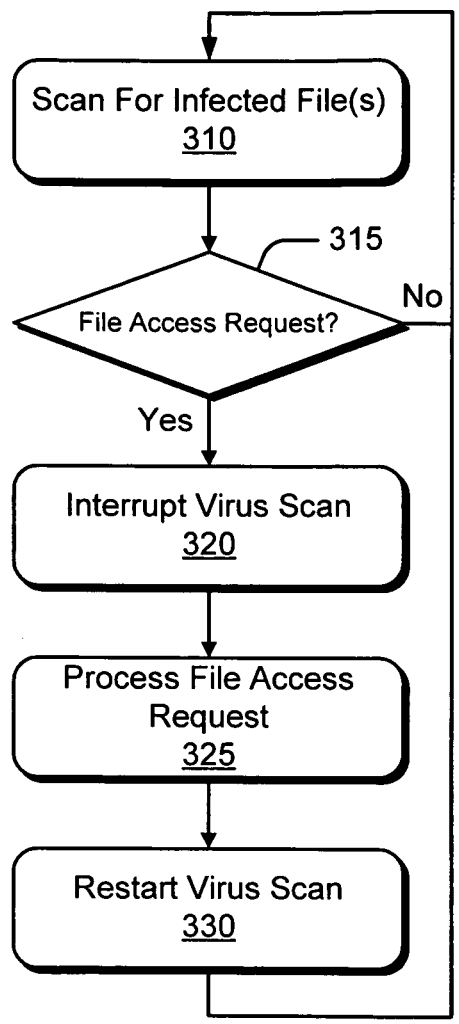
FIG. 3 is a flowchart illustrating operations in one embodiment of a method of anti-viral scanning in network attached storage.

FIG. 3 is a flowchart illustrating operations in one embodiment of a method of anti-viral scanning in network attached storage. The operations of FIG. 3 cause virus scan process executing in NAS device 200 to be interrupted in response to a file access request from a network client 112. Interrupting the virus scan process enhances the response time of the NAS device 200. In some embodiments, the operations depicted in FIG. 3 are implemented by the virus scanning module 260 and/or the control module 262.

At operation 310 a virus scan process scans files on the NAS device 200 for infected files. In some embodiments the virus scanning module 260 initiates the virus scan process, which sequentially scans the entire contents of the storage media 280. In some embodiments a subset of files on the storage media 280 is scanned. For example, virus scanning module 260 scans only files that have been accessed since a previous virus scan. Alternatively, virus scanning module 260 may scan only files that have been the recipients of a read or a write operation since a previous virus scan.

At operation 315 the control module 262 monitors for file access requests directed to NAS storage device 200. If, at operation 315, no file access request is received, then the scanning process continues while the control module 262 continues to monitor for file access requests.

By contrast, if at operation 315 a file access request is received then at operation 320 the virus scan process is interrupted. For example, the control module 262 transmits an instruction to the virus scanning module 260 to interrupt the virus scanning process. At operation 325 the file access request is processed. For example, the I/O operation (e.g., read, write, open) associated with the file access request is executed by the NAS storage device 200.

In some embodiments, the virus scanning process is interrupted until the I/O operation associated with the file access request is completed. Thus, at operation 330 the virus scanning process is restarted. For example, the control module 262 transmits an instruction to the virus scanning module 260 to resume the virus scanning process. Control then passes back to operation 310 and the virus scanning process continues until the next file access request is received.

Figure 4:
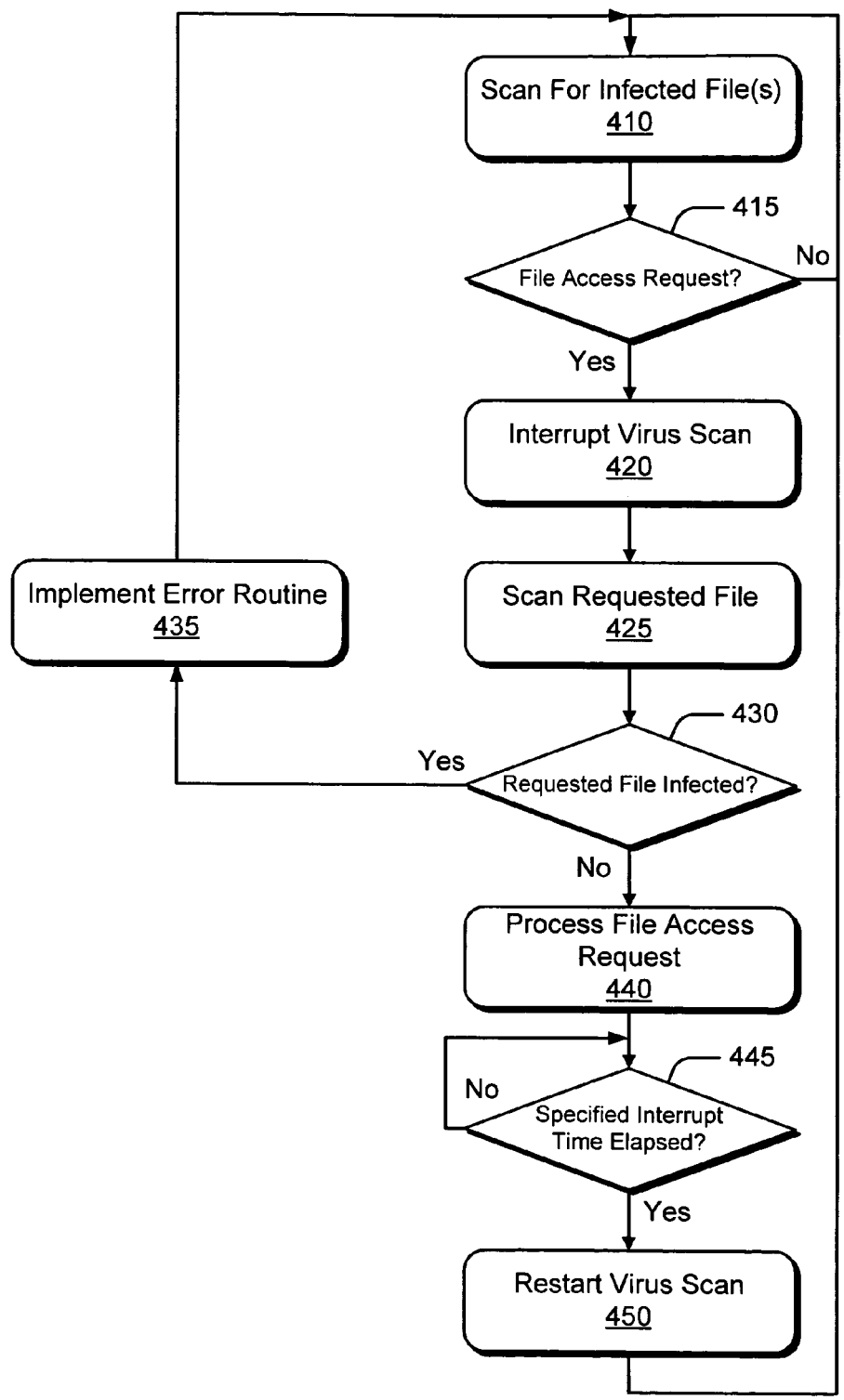
FIG. 4 is a flowchart illustrating operations in one embodiment of a method of anti-viral scanning in network attached storage.

FIG. 4 is a flowchart illustrating operations in one embodiment of a method of anti-viral scanning in network attached storage. The operations of FIG. 4 also cause virus scan process executing in NAS device 200 to be interrupted in response to a file access request from a network client 112. Interrupting the virus scan process enhances the response time of the NAS device 200. In some embodiments, the operations depicted in FIG. 4 are implemented by the virus scanning module 260 and/or the control module 262.

At operation 410 a virus scan process scans files on the NAS device 200 for infected files. In some embodiments the virus scanning module 260 sequentially scans the entire contents of the storage media 280. In some embodiments, a subset of files on the storage media 280 is scanned. For example, virus scanning module 260 scans only files that have been accessed since a previous virus scan. Alternatively, virus scanning module 260 may scan only files that have been the recipients of a read or a write operation since a previous virus scan.

At operation 415 the control module 262 monitors for file access requests directed to NAS storage device 200. If, at operation 415, no file access request is received, then the scanning process continues (operation 410) while the control module 262 continues to monitor for file access requests.

By contrast, if at operation 415 a file access request is received then at operation 420 the virus scan process is interrupted. For example, the control module 262 transmits an instruction to the virus scanning module 260 to interrupt the virus scanning process.

In some embodiments a virus scan process may be initiated on the file identified in the file access request. Thus, at operation 425 the requested file is scanned for viruses, Trojan horses, or the like. If, at operation 430, the requested file is infected, then control passes to operation 435 and an error routine is implemented. In some embodiments an error routine generates a signal that indicates the file is infected. In some embodiments, in response to the signal, logic in the NAS storage device 200 terminates the file access request. Alternatively, or in addition, the NAS storage device may transmit an error message to the network client 112*a*, 112*b*, 112*c* which generated the file access request. The virus scanning process then continues at operation 410.

By contrast, if at operation 430 the requested file is not infected, then the file access request is processed (operation 440). For example, the I/O operation (e.g., read, write, open) associated with the file access request may be executed by the NAS storage device 200.

In some embodiments, the virus scanning process is interrupted for a specified period of time. The specified period of time may be fixed such as, for example, a fixed number of milliseconds. Alternatively, the specified period of time may be determined in part as a function of the type of I/O operation specified in the file access request. For example, the specified period of time may be set to "n" milliseconds for a read operation, and a multiple of "n" milliseconds for a write operation. Alternately, the specified period of time may be dynamically set by performance parameters associated with NAS storage device.

Thus, if at operation 445 the specified interrupt time period has not lapsed, then the virus scanning process effectively "times out." When the specified interrupt time elapses, the virus scan is restarted at operation 450 and the virus scanning process continues scanning for infected files (operation 410).

In the operations of FIG. 4, the control module 262 may continue to monitor for file access requests from network clients 112*a*, 112*b*, 112*c* during the interrupt time period implemented in operation 445. Thus, if a second file access request is received during the interrupt time period, then the interrupt may be maintained for an additional time period in response to the second file access request.

Some embodiments may be provided as computer program products, which may comprise a machine-readable or computer-readable medium having stored thereon instructions used to program a computer (or other electronic devices) to perform a process discussed herein. The machine-readable medium may comprise, but is not limited to, floppy diskettes, hard disk, optical disks, CD-ROMs, magneto-optical disks, ROMs, RAMs, erasable programmable ROMs (EPROMs), electrically erasable EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is comprised in at least an implementation. The appearances of the phrase "in one embodiment" in various places in the specification are not necessarily all referring to the same embodiment.

What is claimed is:

1. A method, comprising:
   initiating, by a network attached storage device, a virus scan process on the network attached storage device;
   receiving, by the network attached storage device, a first file access request that identifies a file;
   sending a suspend instruction to suspend the virus scan process to respond to the first file access request, wherein the virus scan process scans at least a subset of files in the network attached storage device; and
   after suspending the virus scan process, initiating a virus scan process on the file identified in the first file access request.

2. The method of claim 1, further comprising:
   receiving a second file access request; and
   maintaining the suspension of the virus scan process that scans at least the subset of files for a specified period of time in response to the second file access request.

3. The method of claim 1, wherein receiving the first file access request occurs during the virus scan process that scans at least the subset of files.

4. The method of claim 1, further comprising:
   resuming the virus scan process operating on at least the subset of files after the virus scan process on the file identified in the first file access request completes.

5. A method, comprising:
   initiating, by a network attached storage device, a virus scan process on the network attached storage device;
   receiving, by the network attached storage device, a first file access request that identifies a file; and
   suspending the virus scan process to respond to the first file access request, wherein suspending the virus scan process comprises suspending the virus scan process for a specified period of time based in part on an access type identified in the first file access request.

6. The method of claim 5, further comprising restarting the suspended virus scan process after the specified period of time elapses.

7. The method of claim 5, wherein the virus scan process scans a subset of files which reside on the network attached storage device.

8. The method of claim 7, wherein the first file access request identifies a file within the subset of files.

9. A network attached storage device, comprising:
   at least one storage media;
   at least one computer processor;
   virus scanning instructions executable on the at least one computer processor to initiate a virus scan process on the storage media of the network attached storage device; and
   control instructions executable on the at least one computer processor to:
      detect a first file access request that identifies a file;
      send a suspend instruction to suspend the virus scan process to respond to the first file access request, wherein the virus scan process is to scan at least a subset of files in the network attached storage device; and
      after suspending the virus scan process, initiate a virus scan process on the file identified in the first file access request.

10. The network attached storage device of claim 9, wherein the control instructions are executable on the at least one computer processor to suspend the virus scan process that scans at least the subset of files for a specified period of time based at least on an access type identified in the first file access request.

11. The network attached storage device of claim 9, wherein the control instructions are executable on the at least one computer processor to:
   receive a second file access request; and
   maintain the suspension of the virus scan process that scans at least the subset of files for a specified period of time in response to the second file access request.

12. A network attached storage device, comprising:
   at least one storage media;
   at least one computer processor;
   virus scanning instructions executable on the at least one computer processor to initiate a virus scan process on the storage media of the network attached storage device; and
   control instructions executable on the at least one computer processor to:
      detect a first file access request that identifies a file; and
      interrupt, for a specified period of time, the virus scan process to respond to the first file access request, wherein the specified period of time is based in part on an access type identified in the first file access request.

13. The network attached storage device of claim 12, wherein the control instructions are executable on the at least one computer processor to restart the virus scan process after the specified period of time elapses.

14. The network attached storage device of claim 12, wherein the virus scanning instructions are executable on the at least one computer processor to scan a subset of files which reside on the network attached storage device.

15. The network attached storage device of claim 14, wherein the first file access request identifies a file within the subset of files.

16. A computer program product comprising logic instructions stored on a non-transitory computer-readable medium which, when executed by a computer processor, configure the computer processor to:
   initiate a virus scan process on a network attached storage device;
   send a suspend instruction to suspend the virus scan process to respond to a first file access request in response to receipt of the first file access request, wherein the virus scan process scans at least a subset of files which reside on the network attached storage device; and after suspending the virus scan process, perform a virus scan process on a file identified by the first file access request instead of performing the virus scan on the subset of files.

17. The computer program product of claim 16, wherein suspending the virus scan process comprises suspending the virus scan process for a specified period of time based at least on an access type identified in the first file access request.

18. A computer program product comprising logic instructions stored on a non-transitory computer-readable medium which, when executed by a computer processor, configure the processor to:
   initiate a virus scan process on a network attached storage device;
   send a suspend instruction to suspend the virus scan process to respond to a first file access request in response to receipt of the first file access request, wherein suspending the virus scan process comprises suspending the virus scan process for a specified period of time; and
   restart the virus scan process after the specified period of time elapses.

19. The computer program product of claim 18, wherein the specified period of time is based at least on an access type identified in the first file access request.

\* \* \* \* \*